United States Patent
Fahey et al.

(10) Patent No.: US 6,284,839 B1
(45) Date of Patent: *Sep. 4, 2001

(54) BLENDS OF THERMOPLASTIC POLYMERS, ELECTROSTATIC DISSIPATIVE POLYMERS AND ELECTROSTATIC DISSIPATIVE ENHANCERS

(75) Inventors: Timothy Edward Fahey, Akron; Robert Jay Coots, Amherst; Gary Franklin Wilson, Grafton, all of OH (US)

(73) Assignee: The B.F. Goodrich Company, Brecksville, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 64 days.

(21) Appl. No.: 08/835,788

(22) Filed: Apr. 15, 1997

Related U.S. Application Data

(63) Continuation of application No. 08/581,715, filed on Dec. 29, 1995, now abandoned.

(51) Int. Cl.$^7$ .............................. C08L 67/02; C08L 69/00; C08L 75/08
(52) U.S. Cl. ............................. 525/66; 525/125; 525/127; 525/129; 525/130; 525/92 A; 524/199; 524/910
(58) Field of Search .................................. 524/199, 910; 525/66, 125, 127, 129, 130, 92 A

(56) References Cited

U.S. PATENT DOCUMENTS

| | | |
|---|---|---|
| 2,465,319 | 3/1949 | Whinfield et al. ..................... 260/75 |
| 2,623,031 | 12/1952 | Dagenkolb ......................... 260/45.4 |
| 2,948,691 | 8/1960 | Windemuth et al. ................. 260/2.5 |
| 3,049,505 | 8/1962 | Grabowski ......................... 260/45.4 |
| 3,070,563 | 12/1962 | Bolgiano ............................ 260/32.6 |
| 3,425,981 | 2/1969 | Puletti et al. ......................... 260/41 |
| 3,625,915 | 12/1971 | Gubler et al. ...................... 260/41 R |
| 3,651,014 | 3/1972 | Witsiepe ............................ 260/75 R |
| 3,740,371 | 6/1973 | Segal ..................................... 260/40 |
| 3,763,109 | 10/1973 | Witsiepe ............................ 260/75 R |
| 3,795,715 | 3/1974 | Cherdron et al. ..................... 260/823 |
| 3,810,956 | 5/1974 | Kimura et al. .................... 260/857 R |
| 3,896,078 | 7/1975 | Hoeschele ......................... 260/45.9 |
| 3,917,630 | 11/1975 | Hambock et al. ................... 260/302 |
| 3,970,715 | 7/1976 | Jarrett ................................ 260/859 R |
| 4,018,738 | 4/1977 | Rawlings ........................... 260/40 R |
| 4,029,694 | 6/1977 | Weipert et al. ...................... 260/475 |
| 4,034,016 | 7/1977 | Baron et al. ......................... 260/858 |
| 4,035,440 | 7/1977 | Khanna et al. .................... 260/859 R |
| 4,179,479 | 12/1979 | Carter, Jr. ............................. 525/66 |
| 4,238,574 | 12/1980 | Megna ................................. 525/130 |
| 4,251,642 | 2/1981 | Tan et al. ................................ 525/66 |
| 4,261,946 | 4/1981 | Goyert et al. ........................ 264/211 |
| 4,279,801 | 7/1981 | Kramer et al. ..................... 260/40 R |
| 4,302,558 | 11/1981 | Ohya et al. ........................... 525/218 |
| 4,332,919 | 6/1982 | Kobayashi et al. .................. 524/504 |
| 4,332,920 | 6/1982 | Foy et al. ............................. 525/408 |
| 4,350,792 | 9/1982 | Goswami et al. ................... 525/129 |
| 4,369,285 | 1/1983 | Sanderson et al. .................. 524/538 |
| 4,384,078 | 5/1983 | Ohya et al. ........................... 525/296 |
| 4,423,185 | 12/1983 | Matsumoto ............................ 525/66 |
| 4,543,390 | 9/1985 | Tanaka et al. ......................... 525/63 |
| 4,567,236 | 1/1986 | Goldwasser et al. ................ 525/127 |
| 4,588,773 | 5/1986 | Federl et al. ............................ 525/64 |
| 4,643,949 | 2/1987 | Kolycheck et al. .............. 428/425.9 |
| 4,716,198 | 12/1987 | Murabayashi ......................... 525/92 |
| 4,719,263 | 1/1988 | Barnhouse et al. .................. 525/187 |
| 4,743,650 | 5/1988 | Boutni .................................... 525/92 |
| 4,751,118 | 6/1988 | Wypart et al. ......................... 428/35 |
| 4,775,716 | 10/1988 | Kipouras et al. ...................... 525/64 |
| 4,857,590 | 8/1989 | Gagger et al. ......................... 525/64 |
| 4,871,804 | 10/1989 | Murabayashi ......................... 525/92 |
| 4,906,681 | 3/1990 | Wozniak ............................... 524/314 |
| 4,912,142 | 3/1990 | Vermeulen et al. ................. 521/105 |
| 4,912,177 | 3/1990 | Skochdopole et al. ............. 525/454 |
| 4,914,150 | 4/1990 | Prier ..................................... 524/701 |
| 4,920,167 | 4/1990 | Ruetman et al. .................... 524/155 |

(List continued on next page.)

FOREIGN PATENT DOCUMENTS

| | | |
|---|---|---|
| 8822462 | 4/1989 | (AU) . |
| 4113891 | 10/1992 | (DE) . |
| 4128274 | 3/1993 | (DE) . |
| 0242158 | 10/1987 | (EP) . |
| 0334186 | 3/1988 | (EP) . |
| 0361712 | 4/1990 | (EP) . |
| 0420017 | 4/1991 | (EP) . |
| 0431634 | 6/1991 | (EP) . |
| 0453929 | 10/1991 | (EP) . |
| 1393811 | 4/1975 | (GB) . |
| 1513197 | 6/1978 | (GB) . |
| 2021600 | 12/1979 | (GB) . |
| 2210376 | 6/1989 | (GB) . |
| 47-35300 | 9/1972 | (JP) . |
| 58157861 | 9/1983 | (JP) . |
| 3-259947 | 11/1991 | (JP) . |
| 9109906 | 7/1991 | (WO) . |
| WO9213036 | 8/1992 | (WO) . |
| 9514058 | 5/1995 | (WO) . |

OTHER PUBLICATIONS

Polymer Science U.S.S.R., vol. 14, No. 1, 1972, L.A. Cherkasova et al., "Effect of the Nature of Low–Molecular Diols of the Ethylene Oxide Series on the Properties of Poly(Ester Urethane) Thermoplastic Elastomers", pp. 82–88.

(List continued on next page.)

Primary Examiner—David J. Buttner
(74) Attorney, Agent, or Firm—Thoburn T. Dunlap; Daniel J. Hudak; Charles A. Crehore

(57) ABSTRACT

This invention relates to a blend of polymers having electrostatic dissipative properties. The blend in particular comprises a thermoplastic base polymer, electrostatic dissipative agent and acrylic ESD enhancer.

6 Claims, No Drawings

U.S. PATENT DOCUMENTS

| | | | |
|---|---|---|---|
| 4,956,438 | 9/1990 | Ruetman et al. | 528/60 |
| 4,990,357 | 2/1991 | Karakelle et al. | 427/2 |
| 5,010,139 | 4/1991 | Yu | 525/187 |
| 5,023,036 | 6/1991 | Lee et al. | 264/211.23 |
| 5,024,792 | 6/1991 | Havens | 264/22 |
| 5,047,495 | 9/1991 | Kolycheck | 528/76 |
| 5,077,330 | 12/1991 | Ehrhart et al. | 524/314 |
| 5,096,995 | 3/1992 | Fukumoto et al. | 528/125 |
| 5,130,370 * | 7/1992 | Udipi | 525/57 |
| 5,159,053 | 10/1992 | Kolycheck et al. | 528/76 |
| 5,169,899 | 12/1992 | Uehara et al. | 525/66 |
| 5,225,476 | 7/1993 | Sperk, Jr. et al. | 524/507 |
| 5,237,009 | 8/1993 | Lee | 525/187 |
| 5,258,445 | 11/1993 | Sperk, Jr. et al. | 524/597 |
| 5,319,039 | 6/1994 | Moses et al. | 525/424 |
| 5,334,647 | 8/1994 | Sperk, Jr. et al. | 524/507 |
| 5,342,889 | 8/1994 | Sullivan et al. | 525/127 |
| 5,348,999 * | 9/1994 | de Jong | 524/377 |
| 5,436,296 | 7/1995 | Swamikannu et al. | 525/166 |
| 5,614,589 * | 3/1997 | Niznik | 525/130 |

OTHER PUBLICATIONS

European Polymer Journal, vol. 25, No. 12, 1989, Allan W. McLennaghan et al., "Linear Segmented Polyurethane Electrolytes—II. Conductivity and Related Properties", pp. 1297–1302.

ASTM Designation: D 257–93, "Standard Test Methods for DC Resistance or Conductance of Insulating Materials", pp. 107–123.

ASTM Designation: D 412–92, "Standard Test Methods for Vulcanized Rubber and Thermoplastic Rubbers and Thermoplastic Elastomers–Tension", pp. 41–53.

ASTM Designation: D 638–94b, "Standard Test Method for Tensile Properties of Plastics", pp. 47–58.

ASTM Designation: D 790–91, "Standard Test Methods for Flexural Properties of Unreinforced and Reinforced Plastics and Electrical Insulating Materials", pp. 269–278.

ASTM Designation: D 1238–82, "Standard Test Method for Flow Rates of Thermoplastics By Extrusion Plastometer", pp. 563–575.

Encyclopedia of Polymer Science and Engineering, vol. 11, John Wiley & Sons, Inc., 1985, pp. 648–718.

Encyclopedia of Polymer Science and Engineering, vol. 12, John Wiley & Sons, Inc., 1988, pp. 217–256.

Encyclopedia of Polymer Science and Engineering, vol. 6, John Wiley & Sons, Inc., 1986, pp. 383–522.

Encyclopedia of Polymer Science and Engineering, vol. 13, John Wiley & Sons, Inc., 1988, pp. 464–531.

Encyclopedia of Polymer Science and Engineering, vol. 2, John Wiley & Sons, Inc., 1985, pp. 590–605.

Encyclopedia of Polymer Science and Engineering, vol. 1, John Wiley & Sons, Inc., 1985, pp. 452–470.

Encyclopedia of Polymer Science and Engineering, vol. 1, John Wiley & Sons, Inc., 1985, pp. 388–426.

Encyclopedia of Polymer Science and Engineering, vol. 13, John Wiley & Sons, Inc., 1988, pp. 243–303.

Encyclopedia of Polymer Science and Engineering, vol. 12, John Wiley & Sons, Inc., 1988, pp. 49–52.

Encyclopedia of Polymer Science and Engineering, 2nd Edition, vol. 1, John Wiley & Sons, Inc., pp. 234–295.

Miles et al., Polymer Technology, Chemical Publishing Co., NY, 1979, pp. 284–317.

Miles et al., Polymer Technology, Chemical Publishing Co., NY, 1979, pp. 318–341.

Miles et al., Polymer Technology, Chemical Publishing Co., NY, 1979, pp. 374–380.

Miles et al., Polymer Technology, Chemical Publishing Co., NY, 1979, pp. 342–356.

Miles et al., Polymer Technology, Chemical Publishing Co., NY, 1979, pp. 346–348.

Mitech Corporation, "Material Safety Data Sheet", Copolyester Polymer, M–611, Jul. 1995, pp. 1–5.

Kreha Corp. America New York, Article on Bayon, Mar. 25, 1990, pp. 2–8.

Kreha Corp. America New York, Material Safety Data Sheet, Bayon YM–301C.

Kureha Kagaku Co., Ltd., A. Kaneko, "Kureha Antistatic Resin: Properties And Use of Bayon", Kogyo Zairyo, 30(13):94–100 (1982), pp. 1–20.

CRYO Industries, Technical Data, "Acrylite® Acrylic Molding Compounds", Dec. 17, 1993; pp. 1–6.

CRYO Industries, Technical Data, "XT® Polymer Acrylic--Based Multipolymer Compounds", 1993, pp. 1–7.

Eastman, "Physical Property Data Sheet Kodar PETG Copolyester 6763".

Abstract only—Japanese Publication No. 1182359 dated Jul. 20, 1989.

Japanese Publication No. 63137949 dated Jun. 9, 1988—Abstract only.

Japanese Publication No. 5156043 dated Jun. 22, 1993—Abstract only.

Federal Test Method Standard No. 101C, "Electrostatic Properties of Materials", Oct. 8, 1982, pp. 1–9.

* cited by examiner

BLENDS OF THERMOPLASTIC POLYMERS, ELECTROSTATIC DISSIPATIVE POLYMERS AND ELECTROSTATIC DISSIPATIVE ENHANCERS

This is a continuation of application Ser. No. 08/581,715, filed Dec. 29, 1995 now abandoned.

FIELD OF INVENTION

This invention relates to blends of polymers having electrostatic dissipative properties. In particular, the invention relates to blends of thermoplastic base polymers, electrostatic dissipative ("ESD") agent and acrylic ESD enhancer.

BACKGROUND OF THE INVENTION

Blends of thermoplastic materials are useful for various applications. U.S. Pat. No. 4,179,479 to Russell P. Carter, Jr. relates to thermoplastic polyurethane materials containing a processing aid. More particularly, the patent to Carter relates to a thermoplastic polyurethane composition comprising: (A) from 40 to 100 percent by weight of a thermoplastic polyurethane, (B) from 0 to 60 percent by weight of a thermoplastic polymer selected from the group consisting of thermoplastic polycarbonates, thermoplastic polyoxymethylenes, thermoplastic acrylonitrile/butadiene/styrene graft copolymers, thermoplastic polybutylene terephthalates, thermoplastic polyethylene terephthalates, and mixtures thereof and (C) from 0.5 to 10 percent by weight based on the amount of (A) and (B), of a processing aid which is an acrylic polymer having a number average molecular weight of from 500,000 to 1,500,000.

Although the patent discloses blends that include thermoplastic polymers with an acrylic processing aid, it is tellingly silent as to the electrostatic dissipative properties of the blends. Nonetheless, the accumulation and retention of static electrical charges on the surfaces of most plastics due to their low conductivity is well known. The accumulation of static charge on the surface of a plastic is undesirable for various reasons. Sometimes the static charge on these materials can discharge very quickly which can possibly damage components or articles which come in contact with the plastic. In addition, dust is typically attracted to and accumulates on materials carrying a static charge. Therefore, the electrostatic dissipative properties of plastic materials are of importance in various applications where static charge accumulation must be avoided.

Four major approaches have been used to alleviate the accumulation of static electrical charges in plastics: external chemical treatments, internal chemical additives, conductive fillers and polymeric additives. Each approach while effective in certain specific applications, suffers from deficiencies.

The external chemical treatments, hygroscopic surfactants which can be applied to the surface of the plastic article, suffer due to their reliance on high humidity for effectiveness. Generally, the relative humidity needs to be greater than 30%. Also, permanence is an issue since the external chemical treatment can be rubbed, wiped or washed off resulting in a loss of electrostatic dissipative ("ESD") protection. These types of chemical treatments are particularly undesirable in sensitive electronic handling applications where contamination of the components is an issue. Examples of these chemical treatments include fatty acids and their amines or salts, quaternary ammonium salts, monoalkyl glycerides, alkyl phosphonates and sulfonamides.

Internal chemical additives rely upon additive migration to the surface of the plastics to provide ESD protection to the plastic. Internal chemical additives are generally low molecular weight non-polymeric, hygroscopic surfactants which are compounded into the plastic material itself. While this approach provides more permanence than the external chemical treatments, just like external chemical treatments it is also prone to be rubbed, wiped or washed away. Internal chemical additives migrate to the surface of the plastic because of their limited compatibility with the plastic. When the additive migrates to the surface, it can be wiped, abraded or washed off, leaving the surface without any ESD protection. A static charge can then build on the surface, since the material is not protected. This lack of permanence results in periods of ESD susceptibility in which the plastic cannot dissipate a charge until additional additives can bloom to the surface. In addition, contamination of sensitive components which come into contact with the plastic article containing the ESD additive can occur. The internal chemical additives also depend upon high humidity to be effective.

The use of conductive fillers can also alter the ESD properties of plastics. Examples of conductive fillers include conductive carbon black and metallic fibers or fillers. Although the conductive fillers are neither humidity dependent nor susceptible to being wiped, washed or rubbed away, they do have certain disadvantages. For example, conductive fillers tend to increase the melt viscosity for processing the blend. Also, conductive fillers tend to limit the colorability of the plastic materials. Generally, they also tend to decrease the physical properties of the blend such as impact resistance.

Numerous examples of internal polymeric additives exist. An example of the addition of an electrostatic dissipative polymer being added to an insulative polymer can be found in U.S. Pat. No. 3,425,981 to Puletti. The patent to Puletti discloses an olefin polymer composition containing ethylene oxide based polymers and exhibiting enhanced antistatic properties. Additionally, U.S. Pat. No. 5,010,139 to Yu discloses an antistatic polymeric composition consisting of a blend of a polymeric material and antistatic additive which is an ethylene oxide based copolymer or terpolymer material. The polymeric material can be any thermoplastic, thermoplastic elastomer or elastomer including acrylonitrile butadiene styrene (ABS); copolymers of styrene and acrylonitrile modified with acrylic elastomers (ASA); polyamides; polybutylene terephthalate (PBT); polyethylene terephthalate (PET); polyethylene terephthalate glycol (PETG); polymethylmethacrylate (PMMA); polyurethane (TPU); polyvinyl chloride (PVC);chlorinated polyvinyl chloride (CPVC); polycarbonate (PC); polyoxymethylene (POM); polyphenylene oxide (PPO); copolymer of styrene and maleic anhydride SMA; and styrene acrylonitrile copolymer (SAN).

U.S. Pat. No. 5,159,053 discloses a thermoplastic polyurethane which has electrostatic dissipative properties. The thermoplastic polyurethane comprises the reaction product of an ethylene ether oligomer glycol reacted with a non-hindered diisocyanate and an extender glycol. The ethylene ether oligomer intermediate comprises a polyethylene glycol, having a average molecular weight from about 500 to about 5,000.

U.S. Pat. No. 5,342,889 discloses electrostatic dissipative polymeric compositions which are blends of an effective amount of a chain extended polymer and a matrix polymer. The chain extended polymer is formed from low molecular weight polyethers which are reacted with a chain extender and a diisocyanate. The matrix polymers include PVC, CPVC, a terpolymer of styrene, acrylonitrile and diene rubber; a copolymer of styrene and acrylonitrile modified with acrylate elastomers; a copolymer of styrene and acrylonitrile modified with ethylene propylene diene monomer rubber; rubber modified impact polystyrene; thermoplastic polyesters including PBT, PET and polyether-ester block copolymer; polyphenylene oxide; polyacetal; polymethyl methacrylate or mixtures thereof.

The usage of polymeric additives to alleviate the accumulation of static electrical charges in plastics provides a balance of performance advantages not achieved by the other ESD approaches described above. The polymeric additives are generally permanent, non-contaminating, colorable, easy to process, uniform in properties and even recyclable.

Notwithstanding these known polymeric blends and electrostatic dissipative agents, there exists a need for a blend comprising a thermoplastic base polymer and a polymeric additive having improved electrostatic dissipative properties sufficient to cause the bleeding off or dissipation of any occurring static charge.

SUMMARY OF THE INVENTION

The present invention comprises a blend composition having electrostatic dissipative properties comprising a thermoplastic base polymer, an effective amount of polymeric electrostatic dissipative ("ESD") agent and an ESD enhancer. In addition, the novel blend can contain other additives and ingredients.

DETAILED DESCRIPTION

The blend compositions of the present invention comprise a thermoplastic base polymer, an effective amount of a polymeric electrostatic dissipative agent and an acrylic ESD enhancer. Generally, the blend compositions comprise about 50 to about 90% of the thermoplastic base polymer, about 5 to about 50% of the electrostatic dissipative agent, and about 0.1 to about 50% of the acrylic ESD enhancer. Other ingredients generally added to thermoplastic blends such as for example but not limited to lubricants, plasticizers, fillers, processing aids, impact modifiers and pigments may also be included in the compositions. These blends have electrostatic dissipative properties.

The electrostatic dissipative properties are measured by the surface or volume resistivity of the material, and/or by the rate of the dissipation of an applied voltage. Volume resistivity is the inverse of the bulk conductivity and is an intrinsic material property. Surface resistivity is an electrical resistivity measurement taken between two electrodes on the surface of the material. Resistivities are measured in accordance with ASTM Standard D-257.

The static decay tests are carried out according to Federal Test Method Standard 101C, Method 4046.1, "Electrostatic Properties of Materials," with a Static Decay Meter, model 406C, available from Electro-Tech Systems Inc. Static decay is a measure of the ability of a material, when grounded, to dissipate a known charge that has been induced on the surface of the material. A sheet sample or a molded plaque (3"×6") with ⅛-inch thickness is placed between clamp electrodes contained in a Faraday cage. The samples to be tested are conditioned for twenty four hours at twelve (12%) percent relative humidity and 23° C. prior to the testing. The testing is conducted at 12% relative humidity. During the testing, a 5,000-volt charge is applied to the surface of the specimen and the time in seconds required to dissipate the charge to 50 volts (1% of its initial value) is then measured.

Preferably, the present invention relates to a composition having the following electrical properties: a static decay time of less than about 2 seconds (as measured by Federal Test Method Standard 101C), a surface resistivity of less than about $2 \times 10^{12}$ ohms/sq. (as measured according to ASTM D-257) and a volume resistivity of less than about $1 \times 10^{13}$ ohm-cm (as measured according to ASTM D-257). In a more preferred embodiment of the invention, the electrical properties of the composition will have a static decay time of less than about 0.5 seconds, a volume of resistivity of about $1 \times 10^{12}$ ohm-cm, and a surface resistivity of about $1 \times 10^{11}$ ohms/sq. In the most preferred embodiment of the invention, the electrical properties of the composition will have a static decay time of about 0.2 seconds, a volume of resistivity of about $4.4 \times 10^{11}$ ohm-cm, and a surface resistivity of about $9.6 \times 10^{10}$ ohm/sq.

The thermoplastic base polymer of the present invention can be any thermoplastic polymer or blends of thermoplastic polymers. Examples of the thermoplastic base polymers which can be used include polycarbonate; polyurethane; polyesters such as polybutylene terephthalate, polyethylene terephthalate and copolymers such as polyethylene terephthalate glycol; polyamide; homopolymers or copolymers of polyvinyl chloride; chlorinated polyvinyl chloride; copolymers of styrene and acrylonitrile; terpolymers of styrene, acrylonitrile and an elastomer such as for example but not limited to butadiene, acrylic elastomers, ethylene propylene diene rubber, isoprene; polystyrene and rubber modified impact polystyrene; polyacetal; polymethyl methacrylate and its copolymers, polyolefins, and mixtures of any of the above enumerated base polymers. For the purpose and scope of this specification, the term of "thermoplastic base polymer" is expanded to include the thermoplastic base polymer itself, its closely analogous polymers its derivatives, and its copolymers.

A thermoplastic base polymer which can be used in the instant invention is polycarbonate. Polycarbonates are generally a reaction product of a diol, or preferably a dihydric or polyhydric phenol such as bisphenol A, and carbonic acid, phosgene, and the like. Polycarbonates generally have a repeating carbonate group, i.e.,

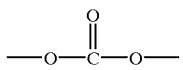

and generally have a

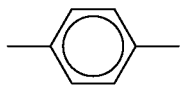

radical attached to the carbonate group. U.S. Pat. No. 3,070,563 is cited and incorporated herein by reference as an example of polycarbonate. Polycarbonates are well known and described in many patents and other technical references. Desirably, the polycarbonate can be characterized by the formula:

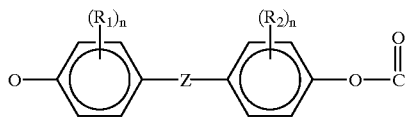

wherein Z is a single bond, an alkylene or alkylidene radical with 1 to 7 carbon atoms, a cycloalkylene or cycloalkylidene radical with 5 to 12 carbon atoms, —O—, —CO—, —SO— or $SO_2$—, preferably methylene or isopropylidene; $R_1$ and $R_2$ are hydrogen, halogen or an alkylene or alkylidene radical having 1 to 7 carbon atoms; and n equals 0 to 4. Aromatic polycarbonates useful in the practice of the invention have a melt flow rate range of about 1 to 60 gms/10 min. at 300° C., as measured by ASTM D-1238. A commercially available polycarbonate from many sources is bis(4-hydroxyphenyl)-2,2-propane, known as bisphenol-A polycarbonate. These and examples of other polycarbonates which can be utilized are set forth in the *Encyclopedia of Polymer Science and Engineering,* Vol. 11, John Wiley & Sons, Inc., New York, N.Y., 1985, pages 648–718. A preferred polycarbonate to be used in the instant invention is Lexan 121, available from G.E. Plastics.

Polyesters can also be utilized as thermoplastic base polymers. Polyesters are products formed by direct esterification between a diol and a diacid or the exchange reaction between a diol and a polyester. An example of such a polyester is polyethylene terephthalate. Polyethylene terephthalate (PET) is generally made from the reaction product of ethylene glycol and dimethyl terephthalate or by direct esterification between ethylene glycol and terephthalic acid under heat and a high vacuum. Moreover, polyethylene terephthalate glycol (PETG) polymers can also be utilized as the thermoplastic base polymer and are known to the art and to the literature. PETG polymers are generally the reaction products of ethylene glycol, a short-chain glycol other than ethylene glycol, and dimethyl terephthalate or terephthalic acid. An example of a commercially available PETG polymer is Kodar PETG Copolyester 6763 from the Eastman Chemical Company.

Another polyester which can be used as the base thermoplastic polymer includes polybutylene terephthalate (PBT). The PBT polymer has the structure of

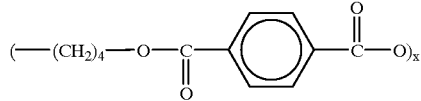

and are generally prepared by heating together terephthalic acid and tetramethylene glycol at a temperature between 220° and 240° C. and thereafter heating the reaction mixture in the absence or presence of nitrogen or an inert gas for several hours. A process for producing polybutylene terephthalate can be found in U.S. Pat. No. 2,465,319. Commercially available PBTs include Valox 325 and Valox 210HP from G.E. Plastics.

Further information on polyethylene terephthalate and polybutylene terephthalate can be found in U.S. Pat. Nos. 4,034,016; 3,740,371; and 4,018,738. Examples of other polyesters which can be utilized are set forth in *Encyclopedia of Polymer Science and Engineering,* Vol. 12, John Wiley & Sons, Inc., New York, N.Y., 1988, pages 217–256.

Additionally, the thermoplastic base polymer of the present invention can be a polyolefin. The polyolefins generally can be any polyolefin or copolymer made from an olefin monomer having from 2 to 8 carbon atoms. Illustrative of olefin homoploymers are high density polyethylene, low density or linear low density polyethylene, polypropylene, polybutylene, or the like. Copolymers of olefins are formed by the copolymerization of an olefin monomer with copolymerizable monomers including vinyl type monomers. Polyethylene, and the various forms thereof, can be utilized as the thermoplastic base polymer. Examples of various types of polyethylene include ultra low density polyethylene, linear low density polyethylene, high density polyethylene, high molecular weight high density polyethylene, and ultra high molecular weight polyethylene. These and examples of other polyethylene polymers which can be utilized are set forth in the *Encyclopedia of Polymer Science and Engineering,* Vol. 6, John Wiley & Sons, Inc., New York, N.Y., 1986, pages 383–522.

Still another type or class of thermoplastic base polymer which can be utilized in the present invention are the various polypropylene polymers, such as isotactic polypropylene and the like. It is to be understood that within the classification of polypropylene polymers and polyethylene polymers are the various copolymers of ethylene and propylene. A description of various polypropylene polymers can be found in the *Encyclopedia of Polymer Science and Engineering,* Vol. 13, John Wiley & Sons, Inc., New York, N.Y., 1988, pages 464–531. An example of a commercially available polypropylene is Profax 6523 from Himont, Inc.

The various polybutylene polymers can also be utilized in the present invention as the thermoplastic base polymer. These polybutylene polymers are derived essentially from high molecular weight, predominantly isotactic poly(1-butene) homopolymers or copolymers. These as well as other examples of various polybutylene polymers which can be utilized in the present invention are set forth in the *Encyclopedia of Polymer Science and Engineering,* Vol. 2, John Wiley & Sons, Inc., New York, N.Y., 1985, pages 590–605, which is hereby fully incorporated by reference.

The styrene polymers which can be used as the thermoplastic base polymer in the present application include homopolymers of styrene (including modified polystyrene such as high impact polystyrene, "HIPS"), copolymers of styrene such as styrene acrylonitrile copolymers ("SAN") and terpolymers of styrene such as ABS polymers (acrylonitrile-butadiene-styrene copolymers). Styrene polymers can be polymerized by bulk, solvent, emulsion or suspension processes. Polystyrene has the following chemical formula:

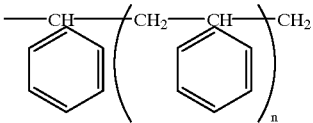

Additional information on polystrene polymers can be found in Miles, *Polymer Technology,* Chemical Publishing Co., N.Y., N.Y. 1979, p. 284–317, incorporated herein by reference. An example of a commercially available styrene polymer is Amoco R450 from the Amoco Chemical Company.

Another thermoplastic base polymer which can be utilized in the present invention is copolymers of generally styrene and acrylonitrile, typically known as SAN, that is, styrene-acrylonitrile copolymers. Such copolymers can generally be produced by either emulsion, suspension, or continuous mass polymerization, and usually are made from a majority, by weight, of styrene monomers. Comonomers other than styrene or acrylonitrile which can be utilized include vinyl acetate, methyl acrylate, maleic anhydride, methyl methacrylate, butyl acrylate, 2-ethylhexyl acrylate and vinyl chloride. These and a further detailed description of SAN-type polymers in general are set forth in the *Encyclopedia of Polymer Science and Engineering* Vol. 1, John Wiley & Sons, Inc., New York, N.Y., 1985, pages 452–470, which is hereby fully incorporated by reference. An example of a copolymer of styrene and acrylonitrile is Tyrin 880, available from Dow Chemical Co.

Other thermoplastic base polymers suitable for use in the present invention are the various ABS type copolymers which are known in the art and to the literature. Such polymers are generally graft copolymers of acrylonitrile, conjugated dienes having from 4 to 8 carbon atoms with butadiene being highly preferred, and a vinyl substituted aromatic having from 8 to about 12 carbon atoms, with styrene being preferred, often referred to as an acrylonitrile-butadiene-styrene copolymer. The amount of the acrylonitrile is generally from about 10 to about 40 percent by weight; the amount of styrene is generally from about 20 to about 70 percent by weight; and the amount of butadiene is generally from about 20 to about 60 percent by weight based upon the total weight of the three-component mixture. Although ABS copolymers are generally a mixture of a styrene-acrylonitrile copolymer and a styrene-acrylonitrile grafted polybutadiene rubber, a terpolymer made from acrylonitrile, butadiene, and styrene monomers can also be used. In lieu of butadiene, other conjugated dienes such as isoprene, pentadiene, dimethylbutadiene, dimethyl pentadiene, and the like can also be utilized. Similarly, in lieu of styrene, vinyl toluene, alpha methyl vinyl toluene, alpha methyl styrene, and the like can be utilized. Although acrylonitrile is normally always utilized, other vinyl cyanides can be utilized such as methacrylonitrile, ethacrylonitrile, and the like can be used in its place. These and examples of other ABS type polymers which can be utilized are set forth in the *Encyclopedia of Polymer Science and Engineering*, Vol. 1, John Wiley & Sons, Inc., New York, N.Y., 1985, pages 388–426. An example of a commercially available ABS is Cycolac GPM-5500, available from the G.E. Plastics.

This phrase, "ABS" is meant to include other polymer resins in which one or more components have been replaced in whole or in part by similar analogous compounds. Exemplary of analogous compounds of acrylonitrile are methacrylonitrile, ethacrylonitrile, halogenated acrylonitriles, and the like, exemplary of analogous compounds of styrene are alpha-methyl styrene, chlorostyrene, vinyl toluene, and the like; exemplary of analogous compounds of butadiene is isoprene, and the like. The phrase is also meant to include acrylate modified ABS, "MABS" where acrylic monomers are used in the ABS. By other styrene containing polymers it is meant polystyrene modified by rubber, compounds of styrene and acrylonitrile copolymers (SAN); copolymers of styrene and acrylonitrile modified with acrylic elastomers (ASA); copolymers of styrene and acrylonitrile modified with ethylene-propylene-diene-monomer (ASE); copolymers of styrene and maleic anhydride; and the like. By ABS and other polymers containing styrene it is also meant polymer blends, which are the physical combination of two or more polymeric resin systems, having ABS and other polymers of styrene in the concentrations greater than 20 weight percent.

Another class of styrene polymers which could be utilized as the thermoplastic base polymer are the various S-(E/B)-S block copolymers wherein the sphere S is made from a vinyl substituted aromatic having from 8 to about 12 carbon atoms as noted immediately herein above, with styrene being preferred, and the center block is a saturated ethylene-butylene rubber. Such a block copolymer is generally known as hydrogenated Kraton G and is available from the Shell Chemical Company. Another class of styrene polymers is the various S-B-S block copolymers where the S block is made from a vinyl substituted aromatic having from 8 to about 12 carbon atoms such as styrene, alphamethylstyrene, and the like, with the styrene being preferred, and the B block is made from a conjugated diene having from 4 to 8 carbon atoms such as butadiene, isoprene, hexadiene, and the like, with butadiene being preferred.

The polyamides which are useful as the thermoplastic base polymer for the present invention include those polymers which are the reaction product of the condensation reaction of a diamine and a dibasic acid. They also include the reaction product of the addition polymerization of cyclic lactones. Generally, the polyamides structurally have alternating hydrocarbon and imido (—NH—CO—) groups. Examples of these compositions include Nylon 6 (poly (ω-aminocaproic acid)(polycaprolactam)); Nylon 66 (polymer of hexamethylenediamine and adipic acid); Nylon 6,10 (polymer of hexamethylenediamine and sebacic acid); and Nylon 11(polymer of ω-amino-undecanoic acid). Copolymers of the same can also be used. Further information on polyamides can also be found in Miles, *Polymer Technology*, Chemical Publishing Co., N.Y., N.Y. 1979, p. 318–341, incorporated herein by reference. Examples of commercially available polyamides are Rilsan BMNO from Elf Atochem and Capron 8200 from Allied Signal, Inc.

Thermoplastic polyurethanes form a suitable class of base thermoplastic polymers. Suitable polyurethanes are prepared by reacting a polyisocyanate and one or more chain extenders with an intermediate such as a hydroxyl terminated polyester, a hydroxyl terminated polyether, a hydroxyl terminated polycaprolactone, a hydroxyl terminated polycarbonate (i.e., a polycarbonate polyol), or mixtures thereof, or amine terminated polyesters, polyethers, or polycarbonates, or mixtures thereof.

A preferred class of hydroxyl terminated polyester intermediates is generally a linear polyester having a molecular weight of from about 500 to about 10,000, desirably from about 700 to about 5,000, and preferably from about 700 to about 4,200, and an acid number generally less than 0.8 and preferably less than 0.5. The molecular weight is determined by assay of the hydroxyl groups. The polyester intermediates are produced by (1) an esterification reaction of one or more glycols with one or more dicarboxylic acids or anhydrides, or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

The dicarboxylic acids can be aliphatic, cycloaliphatic, aromatic, or combinations thereof. Suitable dicarboxylic acids which may be used alone or in mixtures usually have a total of from 4 to 15 carbon atoms and include: succinic, glutaric, adipic, pimelic, suberic, azelaic, sebacic, dodecanoic, isophthalic, terephthalic cyclohexane dicarboxylic, and the like. Anhydrides of the above dicarboxylic acids, such as phthalic anhydride, tetrahydrophthalic anhydride, or the like, can also be utilized, with adipic acid being preferred.

The ester-forming glycols can be aliphatic, aromatic, or combinations thereof; have a total of from 2 to 12 carbon atoms; and include: ethylene glycol, propylene-1,2-glycol, 1,3-propanediol, butylene-1,3-glycol, 1,4-butanediol, 1,5-pentanediol, 1,6-hexanediol, 2,2-dimethyl-propane-1,3-diol, 1,4-cyclohexanedimethanol, decamethylene glycol, dodecamethylene glycol, and the like, with 1,4-butanediol being a preferred glycol.

The lactones preferred for preparing the hydroxyl terminated polycaprolactones are epsilon-caprolactones having the general formula

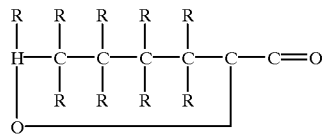

wherein at least 6 of the R's are hydrogen and the remainder are hydrogen or alkyl groups containing 1 to 10 carbon atoms, preferably methyl.

It is noted that suitable polycarbonate polyols can also be utilized as an intermediate, and the same, as well as methods of preparation thereof, are disclosed in U.S. Pat. No. 4,643,949, which is hereby fully incorporated by reference. Other low molecular weight polycarbonate polyol intermediates can also be made from diols such as those set forth hereinabove, including 1,6-hexanediol, and the like, and phosgene; or by transesterification with low molecular weight carbonates such as diethyl or diphenyl carbonate.

The hydroxyl terminated polyethers can be polyether polyols derived from a diol or polyol having a total of from 2 to 15 carbon atoms, preferably an alkyl diol or glycol which is reacted with an ether comprising an alkylene oxide having from 2 to 6 carbon atoms, or mixtures thereof. Useful commercial polyether polyols include poly(ethylene glycol), poly(propylene-ethylene glycol), poly (tetramethylene ether glycol) (PTMEG), copolyethers produced from tetrahydrofuran (THF) and ethylene oxide or TEF and propylene oxide, glycerol adduct comprising glycerol reacted with propylene oxide, trimethylolpropane adduct comprising trimethylolpropane reacted with propylene oxide, pentaerythritol adduct comprising pentaerythritol reacted with propylene oxide, and similar hydroxyl functional polyethers.

In addition to the above polyether type intermediates, other intermediates can be utilized known to those skilled in the art as well as to the literature such as those having different molecular weights, made from different reactants, and the like. The above-mentioned polyols can be used alone or in any combination.

The intermediate is further reacted with one or more polyisocyanates and preferably a diisocyanate along with an extender glycol, desirably in a "one-shot" process, that is, a simultaneous coreaction of the intermediate, diisocyanate, and extender glycol, to produce a moderate molecular weight linear polyurethane having a melt index of from about 0 to about 150 and preferably from about 0 to about 75 at 230° C. at 2,160 grams. The equivalent amount of diisocyanates to the total amount of hydroxyl and/or amine-containing components, that is, the hydroxyl or amine terminated polyester, polyether, etc., and chain extender glycol, is from about 0.95 to about 1.12 or even 1.20, and desirably from about 0.98 to about 1.06. Alternatively, the polyurethane can be made in a conventional two-step process wherein initially a prepolymer is made from the polyisocyanate and the intermediate, with the prepolymer subsequently being reacted with the chain extender glycol. The equivalent ratio of the one or more diisocyanates to the hydroxyl or amine terminated intermediate is generally a sufficient amount such that upon subsequent chain extension with a suitable glycol, the overall equivalent ratio of the hydroxyl or amine terminated compounds to the one or more polyisocyanates is approximately 0.95 to about 1.06, and the like. Often it can be an excess such as up to about 1.20 or less, or 1.15 or less.

Any suitable diisocyanate can be used in the process. Suitable diisocyanates include non-hindered aromatic diisocyanates such as: 4,4'-methylenebis-(phenyl isocyanate) (MDI); isophorone diisocyanate (IPDI), m-xylylene diisocyanate (XDI), as well as non-hindered cyclic aliphatic diisocyanates such as 1,4-cyclohexyl diisocyanate (CHDI), decane-1,10-diisocyanate, phenylene-1,4-diisocyanate, naphthylene-1,5-diisocyanate, diphenylmethane-3,3'-dimethoxy-4,4'-diisocyanate, dicyclo-hexylmethane-4,4'-diisocyanate, and cyclohexyl-1,4-diisocyanate, as well as combinations thereof. The most preferred diisocyanate is 4,4'-methylenebis-(phenyl isocyanate) i.e., MDI.

Suitable extender glycols (i.e., chain extenders) are saturated low molecular weight glycols, preferably aliphatic, and in particular, alkylene glycols containing from 2 to about 12 carbon atoms. These normally have molecular weights not over about 500. Representative glycols include ethylene glycol, diethylene glycol, propylene glycol, dipropylene glycol, 1,4-butanediol, 1,6-hexanediol, 1,3-butanediol, 1,5-pentanediol, 1,4-cyclohexane-dimethanol, hydroquinone di(hydroxyethyl)ether, diethylene glycol, neopentyl glycol and 3-methyl-1,5-pentane-diol, as well as cycloaliphatic and aromatic glycols, and combinations thereof, with 1,4-butanediol being preferred.

In the one-shot polymerization process, a simultaneous reaction occurs between three components: one or more polyol prepolymers, polyisocyanate, and extender glycol. The reaction is generally initiated at temperatures above 100° C. and desirably above 120° C. Inasmuch as the reaction is exothermic, the reaction temperature generally increases to about 200° C. to 280° C. Similar reaction temperatures are utilized when the polyurethane is made in a two-step process.

Examples of the above, as well as other suitable thermoplastic polyurethanes which can be utilized, are set forth in Vol. 13 of the *Encyclopedia of Polymer Science and Engineering,* John Wiley & Sons, Inc., New York, N.Y., 1988, pages 243–303. Examples of suitable commercially available thermoplastics polyurethanes which can be used in the instant invention include Estane 58277 thermoplastic polyurethane, available from The B. F. Goodrich Company.

An example of a thermoplastic base polymer which can be used in the present invention includes polyvinyl chloride. Polyvinyl chloride, PVC, vinyl polymer, or vinyl polymer material, as used herein, refers to homopolymers and copolymers of vinyl halides and vinylidene halides and includes post halogenated vinyl halides such as CPVC, all which have the vinyl group $CH_2=CH-$. Examples of these vinyl halides and vinylidene halides are vinyl chloride, vinyl bromide, vinylidene chloride and the like. The vinyl halides and vinylidene halides may be copolymerized with each other or each with one or more polymerizable olefinic monomers having at least one terminal $CH_2=C-$ grouping. As examples of such olefinic monomers there may be mentioned the α, β-olefinically unsaturated carboxylic acids, such as acrylic acid, methacrylic acid, ethylacrylic acid, α-cyanoacrylic acid, and the like; esters of acrylic acid, such as methyl acrylate, ethyl acrylate, butyl acrylate, octyl acrylate, cyanoethyl acrylate, hydroxyethyl acrylate, and the like; esters of methacrylic acid, such as methyl methacrylate, butyl methacrylate, hydroxyethyl methacrylate, and the like;

nitriles, such as acrylonitrile, methacrylonitrile, and the like; acrylamides, such as methyl acrylamide, N-methylol acrylamide, N-butyoxy methylacrylamide, and the like; vinyl ethers, such as ethyl vinyl ether, chloroethyl vinyl ether, and the like; the vinyl ketones; styrene and styrene derivatives, such as α-methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art.

In particular, homopolymers and copolymers made by the polymerization of vinyl chloride or vinylidene chloride alone or in a mixture with one or more polymerizable olefinic monomers copolymerizable therewith in amounts up to about 20% by weight, based on the weight of the monomer mixtures may be used. The polymers may be produced by suspension, mass, solution or emulsion processes. The most preferred vinyl polymer, or resin, is polyvinyl chloride (PVC) homopolymer produced by the mass or suspension polymerization process and the invention. An example of a commercially available PVC polymer which can be used in the instant invention is Geon 110×377 from The Geon Company.

Another possible base thermoplastic polymer is polyacetal. Polyacetal is a polymer based upon formaldehyde. Upon polymerization, the polymer takes the form of polyoxymethylene or polymethylene glycol. Further information on polyacetals can be found in Miles, *Polymer Technology*, Chemical Publishing Company, N.Y., N.Y., 1979, p.374–380, incorporated herein by reference.

In addition, acrylic polymers can be used as the thermoplastic base polymer. The major monomer constituents belong to acrylates and methacrylates. The monomers are generally characterized by the formula:

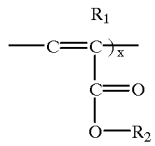

wherein $R_1$ can be hydrogen or aliphatic, cycloaliphatic or aromatic substituents and $R_2$ can be aliphatic, cycloaliphatic or aromatic substituents. Further information on acrylics can be found in Miles, *Polymer Technology*, Chemical Publishing Company, N.Y., N.Y., 1979, p. 342–356.

In addition to the base thermoplastic polymer in the composition, an electrostatic dissipative agent also is incorporated into the composition of the instant invention. The electrostatic dissipative agent is a polymer containing or formed from a low molecular weight polyether oligomer having two reactive moieties and a number average molecular weight from about 200 to 20,000 wherein the oligomer can be either a homopolymer of ethylene oxide, or a copolymer of two or more copolymerizable cyclic ether monomers, provided that one of the monomers is ethylene oxide. The comonomer of the low molecular weight polyether oligomer has the formula:

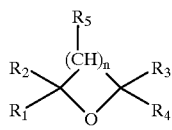

wherein $R_1$, $R_2$, $R_3$, $R_4$, and $R_5$ are independently hydrogen, unsubstituted or substituted alkyl, cycloalkyl, cycloakenyl, aryl, aralkyl, and wherein the substituents are $OR_6$, $SR_6$, CN or halogens, $R_6$ is hydrogen, alkyl, cycloalkyl, cycloalkenyl, aryl, aralkyl, alkaryl, or carboxyl, and n is 0,1,2, or 4. The alkyl groups can have from 1 to 6 carbon atoms, be straight or branched chain and may be unsubstituted or substituted. The cycloalkyl and cycloalkenyl groups can have from 3 to 8 ring carbon atoms and from 1 to 3 rings. The cycloalkenyl groups can have 1 or 2 double bonds. The aryl groups can have from 6 to 10 ring carbon atoms and one or two rings.

The low molecular weight polyether oligomer comprising the homopolymer of ethylene oxide has a number average molecular weight from about 200 to about 5000. The low molecular weight polyether oligomer comprising the copolymer of two or more copolymerizable monomers wherein one of the monomers is ethylene oxide has a number average molecular weight from about 200 to 20,000.

Exemplary of the comonomers which can be copolymerized with ethylene oxide are: 1,2-epoxypropane(propylene oxide); 1,2-epoxybutane; 2,3-epoxybutane(cis & trans); 1,2-epoxypentane; 2,3-epoxypentane(cis & trans); 1,2-epoxyhexane; 2,3-epoxyhexane(cis & trans); 3,4-epoxyhexane(cis & trans); 1,2-epoxy heptane; 1,2-epoxydecane; 1,2-epoxydodecane; 1,2-epoxyoctadecane; 7-ethyl-2-methyl-1,2-epoxyundecane; 2,6,8-trimethyl-1,2-epoxynonane; styrene oxide.

Other comonomers which can be used a comonomers with the ethylene oxide are: cyclohexene oxide; 6-oxabicyclo[3,1,0]-hexane; 7-oxabicyclo[4,1,0]heptane; 3-chloro-1,2-epoxybutane; 3-chloro-2,3-epoxybutane; 3,3-dichloro-1,2-epoxypropane; 3,3,3-trichloro-1,2-epoxypropane; 3-bromo-1-2-epoxybutane; 3-fluoro-1,2-epoxybutane; 3-iodo-1,2-epoxybutane; 1,1-dichloro-1-fluoro-2,3-epoxypropane; 1-chloro-1,1-dichloro-2,3-epoxypropane; and 1,1,1,2-pentachloro-3,4-epoxybutane.

Typical comomoners with at least one ether linkage useful as comomoners are exemplified by: ethyl glycidyl ether; n-butyl glycidyl ether; isobutyl glycidyl ether; t-butyl glycidyl ether; n-hexyl glycidyl ether; 2-ethylhexyl glycidyl ether; heptafluoroisopropyl glycidyl ether; phenyl glycidyl ether; 4-methyl phenyl glycidyl ether; benzyl glycidyl ether; 2-phenylethyl glycidyl ether; 1,2-dihydropentafluoroisopropyl glycidyl ether; 1,2-trihydrotetrafluoroisopropyl glycidyl ether; 1,1-dihydrotetrafluoropropyl glycidyl ether; 1,1-dihydranonafluoropentyl glycidyl ether; 1,1-dihydropentadecafluorooctyl glycidyl ether; 1,1-dihydropentadecafluorooctyl-α-methyl glycidyl ether; 1,1-dihydropentadecafluorooctyl-β-methyl glycidyl ether; 1,1-dihydropentadecafluorooctyl-α-ethyl glycidyl ether; 2,2,2-trifluoro ethyl glycidyl ether.

Other comonomers with at least one ester linkage which are useful as comonomers to copolymerize with ethylene oxide are: glycidyl acetate; glycidyl chloroacetate; glycidyl butyrate; and glycidyl stearate; to name a few.

Typical unsaturated comonomers which can be polymerized with ethylene oxide are: allyl glycidyl ether; 4-vinylcyclohexyl glycidyl ether; α-terpinyl glycidyl ether; cyclohexenylmethyl glycidyl ether; p-vinylbenzyl glycidyl ether; allyphenyl glycidyl ether; vinyl glycidyl ether; 3,4-epoxy-1-pentene; 4,5-epoxy-2-pentene; 1,2-epoxy-5,9-cyclododecadiene; 3,4-epoxy-1-vinylcyclohexene; 1,2-epoxy-5-cyclooctene; glycidyl acrylate; glycidyl methacrylate; glycidyl crotonate; glycidyl 4-hexenoate.

Other cyclic monomers suitable to copolymerize with ethylene oxide are cyclic ethers with four or more member-ring containing up to 25 carbon atoms except tetrahydropyran and its derivatives. Exemplary cyclic ethers with four or more member-ring are oxetane (1,3-epoxide), tetrahydrofuran (1,5-epoxide), and oxepane (1,6-epoxide) and their derivatives.

Other suitable cyclic monomers are cyclic acetals containing up to 25 carbon atoms. Exemplary cyclic acetals are trioxane, dioxolane, 1,3,6,9-tetraoxacycloundecane, trioxepane, troxocane, dioxepane and their derivatives.

Other suitable cyclic monomers are cyclic esters containing up to 25 carbon atoms. Exemplary cyclic esters are beta-valerolactone, epsilon-caprolactone, zeta-enantholactone, eta-caprylactone, butyrolactone and their derivatives.

In the preferred embodiment of the invention, the low molecular weight polyether oligomer is further reacted with a chain extender diol and a diisocyanate to form the electrostatic dissipative agent. Any chain extender diol and diisocyanate can be used in the formation of the polymer containing the low molecular weight polyether oligomer which is used as the electrostatic dissipating agent. The preferred chain extender is 1,4-butanediol, the preferred polyether oligomer is polyethylene glycol and the preferred diisocyanate is 4,4'-methylene-bis(phenyl isocyanate). In the preferred embodiment, the number of moles of the diisocyanate per mole of the sum of the number of moles of the low molecular weight polyether oligomer plus the number of moles of the chain extender diol is from 0.95 to about 1.06. The ingredients as well as any additional additives are polymerized by a standard high temperature melt polymerization procedure. Further information on this polymer and its processing can be found in U.S. Pat. Nos. 5,159,053 and 5,342,889, incorporated herein by reference. The reaction of the low molecular weight polyether oligomer with the chain extender diol and the diisocyanate will furnish a polymer having melt indices from 0.05 to 100 grams per ten minutes. The preferred melt index range of the polymer as determined according to ASTM D-1238, Procedure A at barrel temperature of 190 C. and an 8700 gram piston load of 1.0 to 65 grams per 10 minutes.

Alternatively, the low molecular weight polyether oligomer can also be reacted to form an electrostatic dissipative agent comprising a copolyetherester polymer comprising one or more polyester blocks as well as one or more low molecular weight polyether oligomer blocks. The polyester block is generally made from an aromatic containing dicarboxylic acid or diester such as terephthalic acid, dimethyl terephthalate, and the like, with a diol generally containing from about 2 to about 10 carbon atoms. The low molecular weight polyether oligomer is generally made as described above. The polyetherester block copolymers can be represented by the following formula:

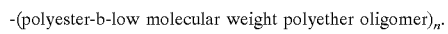
-(polyester-b-low molecular weight polyether oligomer)$_n$.

A preferred embodiment of the polyester-ether block copolymer comprises the reaction product of ethylene glycol, terephthalic acid or dimethyl terephthalate and polyethylene glycol. These and other examples of other polyester-ether copolymers which can be utilized are set forth in the *Encyclopedia of Polymer Science and Engineering*, Vol. 12, John Wiley & Sons, Inc., NY, N.Y., 1988, pages 49–52, which is hereby fully incorporated by reference as well as U.S. Pat. Nos. 2,623,031; 3,651,014; 3,763,109; and 3,896,078.

In a further alternative, the low molecular weight polyether oligomer can also be reacted to form an electrostatic dissipative agent comprising one or more polyamide blocks as well as one or more low molecular weight polyether oligomer blocks. Alternatively, the low molecular weight polyether oligomer may be reacted with the polyamide in the presence of a diacid to form a polyether ester amide having the recurring formula:

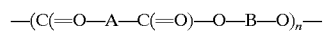
—(C(=O—A—C(=O)—O—B—O)$_n$— where A is the polyamide and B is the low molecular weight polyether oligomer. Further information on this polymer can be found in U.S. Pat. No. 4,332,920, incorporated herein by reference.

Examples of commercially available compositions containing the low molecular weight polyether oligomers and which can be used as the electrostatic dissipative agents in the present invention include Stat-Rite C-2300 ESD agents, available from The B. F. Goodrich Company; Pebax MX 1074, and Pebax 4011 MA, available from Elf Atochem Company, Engineered Polymers Division; and Hytrel 8099, Hytrel 8206, Hytrel 8171 and Hytrel 3548, available from DuPont Company and Hydrin 200, available from Nippon Zeon. Stat-Rite is a trademark of The B. F. Goodrich Company.

The ESD enhancer which is added to the thermoplastic base polymer and the electrostatic dissipating agent in accordance with the instant invention is an acrylic polymer. In particular, the compatibilizing agent comprises polymethyl methacrylate homopolymers, copolymers, and graft copolymers. The polymethyl methacrylate is made from the following monomer:

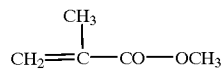

The polymer may be formed by bulk, solution, emulsion, or suspension polymerizations. These methods are described in further detail in Miles, *Polymer Technology*, Chemical Publishing Co., N.Y., N.Y. 1979, p. 346–348, incorporated herein by reference. The polymethyl methacrylate can be used by itself as a homopolymer or as a copolymer. Further information on polymethyl methacrylate polymers can be found in the *Encyclopedia of Polymer Science and Engineering*, Second Edition, Volume 1, John Wiley & Sons, Inc., New York, N.Y., 1985, p. 234–295. An example of a commercially available polymethyl methacrylate polymer is Acrylite S-10, available from Cyro Industries.

Methyl methacrylate can be copolymerized with other compatible monomers. For example, copolymers with other acrylate monomers, butadiene, styrene, other vinyl aromatic monomers, acrylonitrile and the like are possible. An example of copolymer of methyl methacrylate is XT-250, available from Cyro Industries.

Additionally, the polymethyl methacrylate homopolymers or copolymers can be graft polymerized onto other polymers. For example, in the preferred embodiment, 20 to 95% of the polymethyl methacrylate can be graft polymerized onto 5 to 80% of a rubber trunk polymer. The rubber trunk polymer can be a copolymer of 50% to 99% of a conjugated diene and/or an alkyl acrylate and 1% to 50% of a monomer comprising 4 to 500 alkylene oxide groups. Such a polymer is described in U.S. Pat. Nos. 4,332,919; 4,302,558 and 4,384,078, incorporated herein by reference. It is believed that a commercially available example of such a polymer is Bayon YM-312 or YM-301 from Kreha.

In addition, any additives can be utilized in the compositions of the present invention, including conventional additives. Therefore, heat stabilizers, lubricants, heat distortion additives, impact modifiers, flame and smoke retardants, antioxidants, ultraviolet inhibitors, plasticizers, and other processing aids generally used in the processing of thermoplastic polymers can be added to the compositions. Furthermore, pigments, such as titanium dioxide, carbon black, and iron oxide, fillers such as calcium carbonate, silica and the like, and reinforcing agents such as glass fibers, and graphite fibers or glass spheres can be added. These additives can be added in an amount effective for the intended purpose. The amount and use would be within the purview of one of ordinary skill in the art and does not form part of this invention.

The electrostatic dissipating blend of the present invention can be prepared by blending or mixing under the influence of heat and/or pressure by any variety of methods. A well-dispersed composition is especially preferred because moldability and antistatic properties are especially enhanced and physical properties are less impaired. Any type of mechanical means may be used, for example an ordinary mixer, roll mill, calender, blender, kneader, extruder or the like may be used to incorporate the electrostatic dissipating polymer and acrylic ESD enhancer of this invention into the thermoplastic base polymer to form entirely satisfactory blends at convenient and customary operating conditions. For example, the electrostatic dissipating polymer and acrylic ESD enhancer of this invention can conveniently be incorporated into the thermoplastic base polymer by a single or twin screw extruder and molded or extruded directly into a final product, or it can be extruded in the form of rods which are chopped up into pellets and used in subsequent operations. Another example is to use a Banbury mixer to give a moldable composition, then the composition is rolled by a mill to form a thick sheet and cubic pellets of the composition are obtained subsequently using a sheet granulator. Final articles made from the electrostatic dissipating blend composition can be formed by compression molding, injection molding, blow molding, extrusion or calendering.

There are many uses of the electrostatic dissipating composition. For example, the composition can be used to form tubes, paper trays, polymeric films, floor tiles, machine housings, tote bins electronic equipment and appliances, packaging materials, acoustic materials (audio discs, video discs, tapes for recording); building materials, flooring materials, panels, window materials, lighting equipment (lamp shades) carpet fibers and non-woven fiber material transfer equipment (e.g. vacuum hoses) and paper handling equipment and any other applications in general where antistatic properties are desired.

The following non-limiting examples serve to further illustrate the present invention in greater detail. It is to be understood that the specific embodiments discussed herein are provided only for the purpose of illustration, and not by way of limitation.

EXAMPLES

The samples used in the Examples set forth below were tested for electrical properties. In addition to the static decay time, volume resistivity and surface resistivity, various physical tests were performed on some of the blends. The following physical tests were used when the base material was a rigid thermoplastic of the blend: tensile, ASTM D-638; elongation, ASTM D-638; tensile modulus, ASTM D-638; energy to break, ASTM D-638; and flexural modulus, ASTM D-790. For softer base thermoplastic polymers such as polyurethanes used in the blend, the test standards for ASTM D-412 were used to measure tensile and elongation.

All the components of the blend set forth in Table 1 were combined together and mixed in a Werner Pfleiderer Model ZSK 30 mm twin screw extruder operated at 25 to 35 lbs. per hour at the following typical processing conditions:

RPM-125

% max. Torque-75%

Zones:
1–230° C.
2–240° C.
3–210° C.
4–200° C.

Die Zone 200° C.

Melt Temperature 205° C.

The screw designs were configured to provide uniform melting and blending of the compound. The components were injection molded using a Arburg 40 Ton Injection Molding Machine. Typical injection molding parameters used:

Rear Zone 195° C.

Middle Zone 200° C.

Front Zone 210° C.

Nozzle Temp. 210° C.

Injection Speed 30%

Injection Pressure 1000 psi

Holding Pressure 700 psi

Holding Time 10 seconds

Cooling Time 15 seconds

In Table 1, set forth below a polyethylene terephthalate glycol (PETG) used as the base polymer is Eastar 6763 from the Eastman Chemical Company. Table 1 shows that as the electrostatic dissipative agent, StatRite C-2300 from The B. F. Goodrich Company, is added at higher and higher loadings, the electrical properties are enhanced. The Table shows that the static decay time decreases as well as the surface and volume resistivities. Although the electrical properties are enhanced, the physical properties as compared to the base thermoplastic polymer itself such as tensile strength and stiffness are reduced. Examples 8–10 of Table 1 show that acrylic ESD enhancer, Bayon YM-312 from Kreha by itself added to the thermoplastic base polymer does not significantly affect the physical properties. However, it does not provide the desired static decay time or surface and volume resistivities. Therefore, the data shows that the combination of the acrylic ESD enhancer in conjunction with the electrostatic dissipative agent is not simply an additive effect on the ESD properties of the thermoplastic base polymers.

TABLE 1

| Example(s) | 1 | 2 | 3 | 4 | 5 | 6 | 7 | 8 | 9 | 10 |
|---|---|---|---|---|---|---|---|---|---|---|
| Eastar 6763, PETG, Base Polymer | 100 | | 90 | 85 | 80 | 70 | 60 | 90 | 85 | 80 |
| StatRite C-2300 MI 35, ESD Agent | | | 10 | 15 | 20 | 30 | 40 | | | |
| Bayon YM312, Acrylic ESD Enhancer | | 100 | | | | | | 10 | 15 | 20 |
| Electrical Properties | | | | | | | | | | |
| Static Decay Time (sec.) | >30 | 0.8 | >30 | 4 | 2.0 | 0.5 | 0.2 | >30 | >30 | >30 |
| Surface Resistivity (ohms/sq) | E+15 | 2E+11 | 5.51E+12 | 3.08E+13 | 4.64E+12 | 2.87E+12 | 7.81E+11 | 4.5E+14 | 8.7E+14 | 9.9E+14 |
| Volume Resistivity (ohm-cm) | E+16 | 7.9E+11 | 4.09E+13 | 6.62E+13 | 3.2E+13 | 6.2E+12 | 1.93E+12 | 1.9E+15 | 3.7E+15 | >10E15 |
| Physical Testing | | | | | | | | | | |
| Tensile Strength @ Yield (psi) | 7370 | 4880 | 6080 | 5330 | 4740 | 3620 | 2660 | 6930 | 6700 | 6640 |
| Elongation at break (%) | 144 | 27 | 35 | 195 | 233 | 421 | 183 | 161 | 95 | 178 |
| Tensile Modulus (psi) | 275000 | 242000 | 230000 | 203000 | 184000 | 146000 | 102000 | 253000 | 254000 | 251000 |
| Energy to break (lbs/in) | 797 | 146 | 157 | 576 | 681 | 1200 | 584 | 841 | 519 | 931 |
| Flex Modulus (psi) | 297000 | 222000 | 244100 | 216000 | 190600 | 137100 | 86350 | 281000 | 271000 | 271000 |

Table 2 demonstrates that the blend of the instant invention provided enhanced electrical properties when the base thermoplastic polymer is polyethylene terephthalate glycol (Eastar 6373 from Eastman Chemical Company). The components set forth in Table 2 were processed at the same conditions as set forth for the compenents of Table 1. Example 4 of Table 2 shows the addition of 2.5% of an acrylic ESD enhancer in the presence of 10% of the electrostatic dissipative agent gives a static decay time of 1.3 seconds versus greater than 30 seconds without the acrylic ESD enhancer. As seen from the data in Table 2, the surface and volume resistivities also improve. Further, the data in the Table 2 illustrates that the addition of as little as 5% of the acrylic ESD enhancer in combination with only 10% of the ESD agent can provide electrical properties equivalent to a blend containing 30% of the ESD agent without any ESD enhancer (Table 1, Example 6). These electrical properties are achieved in the compositions of the instant invention while retaining a much higher tensile strength and modulus than a composition without the acrylic ESD enhancer by using a small amount of the acrylic ESD enhancer in conjunction with a lesser amount of electrostatic dissipative agent.

Table 3 illustrates both the electrical and physical properties of several different acrylic ESD enhancers in a blend with polyethylene terephthalate glycol (Eastar 6763 from Eastman Chemical) as the base thermoplastic polymer and StatRite C2300 (available from The B. F. Goodrich Co.) as the electrostatic dissipative agent. The acrylic ESD enhancer used in the Examples include Bayon YM 312 (available from Kreha); Acrylite S-10 (available from Cyro Industries) and XT-250 (available from Cyro Industries). These components were processed at the same conditions as those set forth for the components of Table 1. Table 3 shows that the preferred acrylic ESD enhancer is Bayon YM 312 from Kreha due to the better electrical properties as compared to the other two acrylic ESD enhancers. However, all three ESD enhancers in the blend provide improved electrical properties.

TABLE 2

| Example(s) | 1 | 2 | 3 | 4 | 5 |
|---|---|---|---|---|---|
| Eastar 6763, PETG, Base Polymer | 100 | 90 | 89 | 87.5 | 85 |
| StatRite C-2300, ESD Agent* | | 10 | 10 | 10 | 10 |
| Bayon YM312, Acrylic ESD Enhancer | | | 1 | 2.5 | 5 |
| Electrical Properties | | | | | |
| Static Decay Time (sec.) | | >30 | 3.9 | 1.3 | 0.66 |
| Surface Resistivity (ohms/sq) | | 5.51E+12 | 2.91E+12 | 1.88E+12 | 1.41E+12 |
| Volume Resistivity (ohm-cm) | | 4.09E+13 | 1.41E+13 | 4.57E+12 | 2.65E+12 |
| Physical Testing | | | | | |
| Tensile Strength @ Yield (psi) | 7370 | 6080 | 6000 | 5890 | 5830 |
| Etongation at break (%) | 144 | 35 | 50 | 85 | 79 |
| Tensile Modulus (psi) | 275000 | 230000 | 238000 | 228000 | 230000 |
| Energy to break (lbs/in) | 797 | 157 | 234 | 348 | 321 |
| Flex Modulus (psi) | 297000 | 244100 | 238700 | 238500 | 237000 |

*Melt Index 10 at 190° C. (8700 g.)

TABLE 3

| Example(s) | 1 | 2 | 3 | 4 | 5 | 6 | 7 | 8 | 9 | 10 |
|---|---|---|---|---|---|---|---|---|---|---|
| Eastar 6763, PETG, Base Polymer | 80 | 79 | 77.5 | 75 | 79 | 77.5 | 75 | 79 | 77.5 | 75 |
| StatRite C-2300, ESD Agent* | 20 | 20 | 20 | 20 | 20 | 20 | 20 | 20 | 20 | 20 |
| Bayon YM312, Acrylic ESD Enhancer | | 1 | 2.5 | 5 | | | | | | |
| Acrylite S-10, Acrylic ESD Enhancer | | | | | 1 | 2.5 | 5 | | | |
| XT-250, Acrylic ESD Enhancer | | | | | | | | 1 | 2.5 | 5 |
| Electrical Properties | | | | | | | | | | |
| Static Decay Time (sec.) | 1.2 | 0.3 | 0.2 | 0.1 | 1.2 | 1.3 | 1.2 | 0.8 | 0.5 | 0.3 |
| Surface Resistivity (ohms/sq) | 2.7E+11 | 1.7E+11 | 9.6E+10 | 7.0E+10 | 3.5E+11 | 4.3E+11 | 4.3E+11 | 2.9E+11 | 2.0E+11 | 1.2E+11 |
| Volume Resistivity (ohm-cm) | 3.9E+12 | 9.7E+11 | 4.4 E+11 | 2.0 E+11 | 3.7E+12 | 3.4+12 | 2.1 E+12 | 1.7E+12 | 9.4E+11 | 5.2E+11 |
| Physical Testing | | | | | | | | | | |
| Tensile Strength @ Yield (psi) | 4960 | 4790 | 4710 | 4530 | 4600 | 4650 | 4830 | 4850 | 4850 | 4560 |
| Elongation at break (%) | 67 | 150 | 172 | 144 | 112 | 81 | 81 | 146 | 123 | 96 |
| Tensile Modulus (psi) | 208000 | 201000 | 190000 | 192000 | 193000 | 195000 | 200000 | 188000 | 179000 | 198000 |
| Energy to break (lbs/in) | 229 | 541 | 582 | 589 | 364 | 266 | 293 | 478 | 486 | 354 |
| Flex Modulus (psi) | 180000 | 189000 | 186000 | 184000 | 183000 | 188000 | 195000 | 191000 | 188000 | 187000 |

*Melt Index 10 at 190° C. (8700 g.)

The components set forth in Table 4 were processed according to the parameters disclosed above with respect to the components of Table 1. Table 4 again shows that the acrylic ESD enhancer agent by itself, such as Bayon YM 312 from Kreha is ineffective as an electrostatic dissipative agent at levels up to 20%. This is true even if a small amount of approximately 5% of an electrostatic agent such as Stat-Rite C-2300 is added to the blend.

TABLE 4

| Example(s) | 1 | 2 | 3 | 4 | 5 | 6 |
|---|---|---|---|---|---|---|
| Eastar 6763, PETG, Base Polymer | 90 | 89 | 87.5 | 85 | 85 | 84 |
| Bayon YM312, Acrylic ESD Enhancer | 10 | 10 | 10 | 10 | 15 | 15 |
| StatRite C-2300, ESD Agent* | | 1 | 2.5 | 5 | | 1 |
| Electrical Properties | | | | | | |
| Static Decay Time (sec.) | >30 | >30 | >30 | >30 | >30 | >30 |
| Surface Resistivity (ohms/sq) | 4.5E+14 | 1E+15 | 4.1E+14 | 1.5E+13 | 8.7E+14 | 1.7E+14 |
| Volume Resistivity (ohm-cm) | 1.9E+15 | 4.1E+15 | 8.5E+14 | 1.5E+14 | 3.7E+15 | 3.2E+14 |
| Physical Testing | | | | | | |
| Tensile Strength @ Yield (psi) | 6930 | 6770 | 6570 | 6230 | 6700 | 6500 |
| Elongation at break (%) | 161 | 127 | 236 | 203 | 95 | 98 |
| Tensile Modulus (psi) | 253000 | 275000 | 262000 | 227000 | 254000 | 271000 |
| Energy to break (lbs/in) | 841 | 638 | 1200 | 1000 | 519 | 543 |
| Flex Modulus (psi) | 281000 | 271000 | 261000 | 254000 | 271000 | 267000 |

| Example(s) | 7 | 8 | 9 | 10 | 11 | 12 |
|---|---|---|---|---|---|---|
| Eastar 6763, PETG, Base Polymer | 82.5 | 80 | 80 | 79 | 77.5 | 75 |
| Bayon YM312, Acrylic ESD Enhancer | 15 | 15 | 20 | 20 | 20 | 20 |
| StatRite C-2300, ESD Agent* | 2.5 | 5 | | 1 | 2.5 | 5 |
| Electrical Properties | | | | | | |
| Static Decay Time (sec.) | >30 | >30 | >30 | >30 | >30 | >30 |
| Surface Resistivity (ohms/sq) | 9.3E+13 | 8.3E+12 | 9.9E+14 | 2.1E+14 | 1.2E+14 | 4.7E+12 |
| Volume Resistivity (ohm-cm) | 9.9E+14 | 5.5E+13 | >10E15 | 2.8E+14 | 6.6E+14 | 2.7E+13 |
| Physical Testing | | | | | | |
| Tensile Strength @ Yield (psi) | 6320 | 6080 | 6640 | 6370 | 6060 | 5840 |
| Elongation at break (%) | 181 | 174 | 178 | 136 | 66 | 138 |
| Tensile Modulus (psi) | 264000 | 247000 | 251000 | 268000 | 250000 | 246000 |
| Energy to break (lbs/in) | 921 | 864 | 931 | 714 | 376 | 669 |
| Flex Modulus (psi) | 259000 | 246000 | 271000 | 270000 | 258000 | 241000 |

*Melt Index 10 at 190° C. (8700 g.)

Table 5 shows the use of polycarbonate (Lexan 121, available from G.E. Plastics) as the thermoplastic base polymer. All the components of the blend set forth in Table 5 were combined together and then mixed in a Werner Pfleiderer Model ZSK 30 mm twin screw extruder operated at 25 to 35 lbs. per hour at the following typical processing conditions:

RPM-125

% max. Torque-75%

Zones:
1–240° C.
2–255° C.
3–250° C.
4–240° C.
Die Zone 240° C.
Melt Temperature 243° C.

The screw designs were configured to provide uniform melting and blending of the compound. The components were injection molded using a Arburg 40 Ton Injection Molding Machine. Typical injection molding parameters used:

Rear Zone 230° C.
Middle Zone 240° C.
Front Zone 250° C.
Nozzle Temp. 260° C.
Injection Speed 30%
Injection Pressure 1000 psi
Holding Pressure 600 psi
Holding Time 10 seconds
Cooling Time 15 seconds As seen by these examples, three different acrylic ESD enhancers (same as used in the Examples of Table 3) were used in the blend. The most preferred acrylic ESD enhancer in terms of electrical property enhancement is Bayon YM 312 from Kreha.

TABLE 5

| Example(s) | 1 | 2 | 3 | 4 | 5 |
|---|---|---|---|---|---|
| Lexan 121, Polycarbonate, Base Polymer | 80 | 79 | 77.5 | 75 | 79 |
| Acrylite S-10, Acrylic ESD Enhancer | | 1 | 2.5 | 5 | |
| XT-250, Acrylic ESD Enhancer | | | | | 1 |
| Bayon YM312, Acrylic ESD Enhancer | | | | | |
| StatRite C-2300, ESD Agent* | 20 | 20 | 20 | 20 | 20 |
| Electrical Properties | | | | | |
| Static Decay Time (sec.) | 1.0 | 0.92 | 1.04 | 1.29 | 0.69 |
| Surface Resistivity (ohms/sq) | 1E+11 | 2.8E+11 | 2.6E+11 | 3.5E+11 | 2.6E+11 |
| Volume Resistivity (ohm-cm) | 7.7E+11 | 1.2E+13 | 1.7E+12 | 1.6E+12 | 9.7E+11 |
| Physical Testing | | | | | |
| Tensile Strength @ Yield (psi) | 5680 | 6100 | 6150 | 6280 | 6070 |
| Elongation at break (%) | 6.26 | 8.14 | 7.69 | 6.92 | 8.12 |
| Tensile Modulus (psi) | 217000 | 227000 | 238000 | 234000 | 230000 |
| Energy to break (lbs/in) | 32 | 46.1 | 45.4 | 40.4 | 47.7 |
| Flex Modulus (psi) | 195,000 | 216,000 | 213,000 | 218,000 | 212,000 |

| Example(s) | 6 | 7 | 8 | 9 | 10 | 11 |
|---|---|---|---|---|---|---|
| Lexan 121, Polycarbonate, Base Polymer | 77.5 | 75 | 79 | 77.5 | 75 | 100 |
| Acrylite S-10, Acrylic ESD Enhancer | | | | | | |
| XT-250, Acrylic ESD Enhancer | 2.5 | 5 | | | | |
| Bayon YM312, Acrylic ESD Enhancer | | | 1 | 2.5 | 5 | |
| StatRite C-2300, ESD Agent* | 20 | 20 | 20 | 20 | 20 | |
| Electrical Properties | | | | | | |
| Static Decay Time (sec.) | 0.81 | 0.48 | 0.47 | 0.27 | 0.18 | >30 |
| Surface Resistivity (ohms/sq) | 2.1E+11 | 1.5E+11 | 1.5E+11 | 9.4E+10 | 6.0E+10 | 1.0E+17 |
| Volume Resistivity (ohm-cm) | 1.1E+12 | 5.4E+11 | 6.3E+11 | 3.2E+11 | 2.0E+11 | 1.0E+17 |
| Physical Testing | | | | | | |
| Tensile Strength @ Yield (psi) | 6090 | 5900 | 6100 | 5900 | 5730 | 9000 |
| Elongation at break (%) | 8.79 | 10.1 | 10.2 | 9.11 | 8.04 | 125 |
| Tensile Modulus (psi) | 242000 | 226000 | 233000 | 225000 | 222000 | |
| Energy to break (lbs/in) | 53 | 63.4 | 62.7 | 54.6 | 45.9 | |
| Flex Modulus (psi) | 210,000 | 205000 | 212,000 | 209,000 | 206,000 | 340,000 |

*Melt Index 10 at 190° C. (8700 g.)

Table 6 shows the use of a thermoplastic polyurethane as a thermoplastic base polymer and Stat-Rite C2300 as the electrostatic dissipative agent. An acrylic ESD enhancer was used. The ingredients were mixed according to the following conditions. All the components of the blend set forth in Table 6 were combined together and then mixed in a Werner Pfleiderer Model ZSK 30 mm twin screw extruder operated at 25 to 35 lbs. per hour at the following typical processing conditions:

RPM-125

% max. Torque-80%

Zones:
1–220° C.
2–225° C.
3–200° C.
4–180° C.

Die Zone 200° C.

Melt Temperature 202° C.

The screw designs were configured to provide uniform melting and blending of the compound. The components were injection molded using a Arburg 40 Ton Injection Molding Machine. Typical injection molding parameters used:

Rear Zone 180° C.

Middle Zone 195° C.

Front Zone 200° C.

Nozzle Temp. 200° C.

Injection Speed 40%

Injection Pressure 1000 psi

Holding Pressure 700 psi

Holding Time 12 seconds

Cooling Time 15 seconds

Bayon YM312 from Kreha is clearly the preferred acrylic ESD enhancer in this blend.

In summary, a novel and unobvious blend composition having electrostatic dissipative properties has been described as well as the process of forming such a composition. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A blend having electrostatic dissipative properties comprising from about 50 to about 90% by weight of a thermoplastic base polymer; from about 5 to about 50% by weight of an electrostatic dissipative agent; and from about 0.1 to about 20% by weight of an acrylic electrostatic dissipative enhancer, wherein the electrostatic dissipative agent comprises a low molecular weight polyether oligomer reacted with a chain extender diol and a diisocyanate;

wherein the acrylic electrostatic dissipative enhancer comprises a graft copolymer of methyl methacrylate, wherein said graft copolymer contains polymerized therein any one or more alkyl acrylates and methyl methacrylate in a total amount of at least 60% by weight based upon the total weight of said graft copolymer, and wherein said methyl methacrylate is at least 20% by weight based upon the total weight of said graft copolymer;

wherein the blend has a surface resistivity less than about $2.9 \times 10^{12}$ ohms/sq. and a volume resistivity less than about $1.4 \times 10^{13}$ ohms-cm when measured in accordance with ASTM Standard D-257; and wherein the thermoplastic base polymer comprises a polyurethane, polyester, polyamide, homopolymer or copolymer of polyvinyl chloride, chlorinated polyvinyl chloride, copolymer of styrene and acrylonitrile, polystyrene, polyolefin, or mixtures thereof.

2. A blend according to claim 1 wherein said low molecular weight polyether oligomer comprises polyethylene glycol.

3. A blend according to claim 1, wherein said low molecular weight polyether oligomer comprises a copolymer of ethylene oxide and a aliphatic cyclic ether monomer.

4. A blend according to claim 3, wherein said graft copolymer of methyl methacrylate comprises about 20 to about 95% of methyl methacrylate graft polymerized onto about 5 to about 80% of a rubber trunk polymer, based upon 100% total of methyl methacrylate and rubber trunk polymer, wherein said rubber trunk polymer comprises a polymer of about 50 to about 99% total of a conjugated diene and an alkyl acrylate and about 1 to about 50% of a monomer comprising 4 to 5000 alkylene oxide groups, wherein the amount of said electrostatic dissipative agent is from about 10% to about 40% by weight, and wherein the amount of said electrostatic dissipative enhancer is from about 1 to about 5% by weight.

5. The article of claim 4, wherein the article has a surface resistivity of less than about $1.7 \times 10^{11}$ ohms/sq., and a volume resistivity of less than about $9.7 \times 10^{11}$ ohms-cm.

6. An article made from a blend of claim 5.

TABLE 6

| Example(s) | 1 | 2 | 3 | 4 | 5 | 6 | 7 | 8 | 9 | 10 |
|---|---|---|---|---|---|---|---|---|---|---|
| Estane 58277, TPU, Base Polymer | 60 | 59 | 57.5 | 55 | 59 | 57.5 | 55 | 59 | 57.5 | 55 |
| Acrylite S-10, Acrylic ESD Enhancer | | 1 | 2.5 | 5 | | | | | | |
| XT-250, Acrylic ESD Enhancer | | | | | 1 | 2.5 | 5 | | | |
| Bayon YM312, AcryLic ESD Enhancer | | | | | | | | 1 | 2.5 | 5 |
| StatRite C-2300, ESD Agent* | 40 | 40 | 40 | 40 | 40 | 40 | 40 | 40 | 40 | 40 |
| Electrical Properties | | | | | | | | | | |
| Static Decay Time (sec) | 1.43 | 1.17 | 0.93 | 0.88 | 0.88 | 0.71 | 0.47 | 0.51 | 0.36 | 0.31 |
| Surface Resistivity (ohms/sq) | 2.5E+11 | 1.8E+11 | 1.4E+11 | 2.8E+11 | 1.5E+11 | 1.4E+11 | 8.0E+10 | 1.1E+11 | 7.9E+10 | 5.0E+10 |
| Volume Resistivity (ohm-cm) | 4.6E+11 | 6.2E+10 | 9.1E+10 | 2.3 E+11 | 7.6E+10 | 4.3E+10 | 3.0 E+10 | 3.9E+10 | 4.9E+10 | 2.5E+10 |
| Physical Testing | | | | | | | | | | |
| Tensile Strength @ Yield (psi) | 5592 | 5283 | 5179 | 4912 | 5242 | 4874 | 4725 | 4896 | 5216 | 5272 |
| Elongation at break (%) | 654 | 643 | 644 | 651 | 638 | 644 | 656 | 618 | 646 | 654 |

*Melt Index 10 at 190° C. (8700 g.)

* * * * *